United States Patent Office 3,189,563
Patented June 15, 1965

3,189,563
OPEN MESH GLASS FABRIC SUPPORTED CATALYST
Anna P. Hauel, West Orange, N.J., assignor to Engelhard Industries, Inc., Newark, N.J., a corporation of Delaware
No Drawing. Filed Dec. 1, 1960, Ser. No. 72,842
13 Claims. (Cl. 252—460)

This application is a continuation-in-part of my prior co-pending application Serial No. 735,116, filed May 14, 1958 now abandoned.

This invention relates to a novel catalyst carrier and, more particularly, to a catalyst carrier comprising a glass fabric, which may have a refractory material bonded thereto, catalysts containing such a catalyst carrier, and to the production and use of such catalyst carrier and catalyst.

Fixed bed catalysts designed to be serviceable in either liquid or gas phase continuous reactions advantageously have a large exposed area to facilitate contact of the reactants at the catalyst surface. The high contact surface is particularly important in certain gaseous reactions, such as purification of automobile engine exhaust streams and nitric acid plant tail gas streams, where it is necessary to conduct the gas at very high velocity through the space adjacent to the solid catalyst.

The conventional catalyst charge generally consists of a quantity of individual small particles of catalyst in the form of cylinders, spheres, saddles, and the like; these particles usually consist of an inert carrier, coated with an active catalytic element or compound. When the linear velocity of a gas through a catalyst bed is high, conventional catalysts restrict the flow of gas, and a considerable back pressure builds up which is, of course, undesirable from a process standpoint. Further, the catalytic particles do not remain stationary when a high velocity gas stream is passed through a catalyst bed, and the attrition of the catalyst particles against each other results in a grinding off of the active catalytic surface. Similar problems of excessive back pressure and attrition occur when liquid reactants flow at relatively high velocity past the surface of such conventional catalysts.

In accordance with the present invention, high contact area catalyst carriers are provided, which are especially suitable for use in high velocity gas or liquid flow reactions. The catalyst carriers of the present invention are essentially glass fiber fabrics having a refractory coating bonded thereto. By depositing catalytic metals or compounds upon such glass fiber fabrics, directly or indirectly, catalysts are obtained which have a very large contact area, and resistance to flow of a gas stream through or around catalysts supported on such glass fiber fabric carrier is minimal. The problem of catalyst attrition is also much reduced by the use of the catalyst supports of the present invention.

The types of glasses which may be used for the fabrics are generally restricted to those containing a major proportion of silica. Soda-lime or lead oxide glasses may be used, but preferred ones for the purposes of this invention are those softening at high temperatures. Such glasses include those with varying amounts of $B_2O_3$ present, such as Pyrex, Vycor, and Rafersil, high purity amorphous silica, and aluminum silicate glasses such as Fiberfrax.

One useful type of glass thread for the fiber fabrics is that used in industrial filters, such as dust filters. Fabrics made of this type of glass thread resist temperatures up to 600° C., and only by heating fabrics made of such threads for a period of 16 hours or more at a temperature of about 700° C. is a marked weakness of the threads or strands noted. The exact chemical composition of this glass is not known, but it was found that it possessed desirable thermal and chemical properties.

Glass fiber fabrics are manufactured and sold in a large variety of woven patterns; knitted and crocheted fabrics are also available. In the present invention, fabrics having large pore patterns, for example a screen-type woven fabric with 6 to 20 single or multiple warp and weft strands per inch, or a knitted fabric with an open mesh diameter in the range of about $\frac{1}{16}''$ to $\frac{1}{4}''$ are preferred. Knitted fabrics are sold in so-called demisters, and upon unrolling a demister cylinder, many yards of large mesh porous hose, knitted from multiple thread glass fiber, are obtained. The hose or fabric may be reinforced by a very fine metal thread, which provides some rigidity to the knit.

Catalytic metals or metal oxides were deposited on glass fiber threads and fabrics by conventional methods, and it was found that the deposits adhered firmly and were catalytically active. Both good adherence and activity may be attributed to the fibrous structure of the glass, since on massive glass good catalysts were not obtained, using the same methods. Catalytic metals or their oxides can also be deposited on the refractory material-coated glass fiber fabric carriers of this invention with similar good results. Examples of such catalytically active materials are the oxides and the metals of the transition heavy metals of the Periodic Table. The transition heavy metal group is made up of the metals of Groups IIIB, IVB, VB, VIB, VIIB, VIII, IB and IIB. Representative of these various groups of the transition heavy metals are platinum, palladium, rhodium, ruthenium, osmium, iridium, cobalt and nickel in group VIII; gold and silver in group IB; cadmium and zinc in IIB, manganese in VIIB; chromium, molybdenum and tungsten in VIB; vanadium and tantalum in group VB; zirconium and titanium in IVB; and yttrium in group IIIB. The metals or oxides of metals of group VIII, or mixtures thereof are preferred, and of the Group VIII metals, the platinum group metals, e.g., platinum, palladium, rhodium and ruthenium are preferred. Mixtures of the metals or metal oxides can be advantageously employed on the supports in place of the metals or metal oxides singly, if desired. The Periodic Table is taken from the "Periodic Chart of the Elements," revised October 1959, Merck and Co., Inc. (based on Fundamental Chemistry, 2nd Edition, by H. G. Deming).

In one method of coating glass fiber fabrics with a catalyst, the fabric was saturated with a solution which contained the catalytic element, saturation being effected, for example, by dipping and draining off the excess liquid, or by spraying a solution on the fabric. The fabric was allowed to dry in the air, and the catalytic metal or oxide was then liberated by heating. The remaining undesirable components of the original solution were removed after heating by washing or boiling in water. When coating with platinum or palladium, it was found desirable to incorporate a reducing organic compound into the original solution, such as sugar, for example; this facilitated the reduction of the metal salts to metal upon heating. The catalytically active material can be applied to the refractory material-coated glass fabric carrier in similar manner. Catalysts prepared according to the foregoing description and having two components, i.e., an inert carrier of glass fiber fabric and a catalytic element or compound thereon, are usually limited in use to chemical catalytic reactions in which the temperature does not exceed about 600° C.

This invention also contemplates the production of large pore structure catalyst carriers possessing refractory properties. A wide weave type of knit glass fiber fabric is coated with a ceramic or other refractory material and, by applying the ceramic coating sparingly, the basic open weave or large mesh structure of the glass fiber fabric can be maintained.

In order to coat the glass fiber fabrics with ceramic material, suitable fluid dispersions of refractory ceramic precursors are first prepared. Examples of such ceramic materials are Ceramic Slip and such ceramic cements as high alumina cements (e.g., 60 percent $Al_2O_3$, 35 percent CaO, and 5 percent $SiO_2$), hot-setting bonding mortars, air-setting bonding mortars, and filling porcelains or synthetic porcelains. The porcelains can be prepared from silica sand, feldspar and kaolin melted together and subsequently pulverized; they may be then treated with a solution containing $H_3PO_4$ resulting in air-setting and bonding to the glass. Examples of hot-setting bonding mortars are fire clay, blends of raw and calcined clays, blends of calcined and uncalcined diaspore clays, highly siliceous plastic clay such as H-W Star silica fire clay and Vega Bond, dead-burn magnesite and refractory furnace chrome. Examples of air-setting bonding mortars include various compositions such as clays, high silica clays, high alumina clays, silica and chrome. The above-disclosed ceramic precursors are capable of adhering to the glass fabric by a good bond after conversion to the refractory material.

Other refractory oxide materials which will adhere to the glass fabric by a satisfactory bond include alumina, silica, titania and zirconia. It is frequently desirable in order to improve adhesion to apply the refractory oxide to the glass fiber fabric in the form of a concentrated aqueous suspension, in which a hydrous oxide which yields the refractory oxide has been previously dehydrated at a minimum temperature.

The slurry of refractory precursor material applied to the glass fabric is preferably a high solids content slurry and contains preferably more than 40 weight percent refractory precursor solids in water. Such fluid dispersions of alumina have been extensively investigated. While alumina-water mixtures or suspensions having a solids content in the range of about 30 to 70 percent can be used, they preferably contain in excess of 40 weight percent up to 70 weight percent. It was found that the higher the solids content of the slurry, the harder, thicker and more adherent the coating on the threads became. Dispersions containing 50 to 60 percent by weight of alumina were, however, in some instances, too viscous for the coating process. To overcome this undesirable feature, the slurries were fluidized by the addition of minor quantities of certain compounds, among which nitric acid and the nitrates of chromium, yttrium or samarium proved to be effective fluidizers. Not only did these additives control the fluidity of the alumina slurry, they also improved the bonding of the calcined alumina coating as well.

The ceramic materials described above are for the most part disclosed in "Modern Refractory Practice," Harbison-Walker Refractories Co., pages 112 and following, discussing mortar materials, and "Encyclopedia of Chemical Technology," vol. 3, pages 438 following in the article entitled "Cement Products."

In the coating procedure, a sheet or ribbon of glass fabric was dipped into a slurry of a refractory precursor and upon removal, the excess of the adherent slurry was blown off with a high pressure air stream. The damp impregnated fabric was then shaped to a three-dimensional body to fit the catalytic reactor for which the catalyst was intended. For instance, two-inch wide wire reinforced ribbons were rolled up into cylinders of two-inch length. The three-dimensional bodies were dried and calcined in a muffle furnace, at temperatures required for the particular refractory being fired. For example, glass coated with ceramic slips was calcined at a temperature of 850° C., and glass coated with alumina at a temperature in the range of 500 to 600° C. In general, calcining temperatures within the range of about 300° to 1100° C. are employed for converting the refractory precursor to refractory material.

During calcination, the damp refractory precursor is first supported by the glass fiber fabric. Upon reaching the high temperature range the hardened refractory mass supports the fibers and itself, and preserves the original open mesh design of the fabric, in many cases even when the glass fibers become weak, sinter or fuse. The calcined product is a large pore carrier of refractory material, having a skeleton of more or less disintegrated threads. This carrier may be coated or impregnated with the catalytic materials by conventional methods.

The refractory carriers resist heat shock extremely well. They may be placed without preheating into a furnace as hot as 1100° C. and removed again without being damaged. This is also true for carriers in which the original glass skeleton no longer exists in its original coherent form. In contrast, most similar refractory bodies prepared without a skeleton of glass fabric would not tolerate heat shock to this extent.

The composite catalyst of this invention contain in general from about 10 percent to about 90 percent by weight of refractory material and catalytically active material deposited on the glass fabric, the balance being glass fabric and reinforcing wires if they are present; the wires may be about 40 percent of the fabric weight. However, if the deposited material is a catalytically active metal with no refractory material, its weight may be less than 10 percent, for instance from about 1-10 percent by weight. Preferred amounts of deposited refractory material, particularly where high temperature strengthening of the fabric is desired, range from about 40 percent to 90 percent.

The invention will be further illustrated by reference to the following specific examples:

*Example I*

A commercial glass fiber fabric having 20 warp and weft strands per inch, and weighing 5.8 grams per square foot was used as a catalyst support. 25 grams of chloroplatinic acid and 10 grams of sugar were dissolved in water to a total volume of 100 ml. of solution. A piece of the glass fiber fabric, measuring about 5 square feet, was drawn through the solution, and the excess of the absorbed solution was drained off. The impregnated fabric was hung up to dry in the air and, after drying, it was heated in an oven at a temperature of 350° C. for a period of five minutes, after which it was boiled in water three times to remove all the chlorine. The platinum present on the fabric was analyzed as 2.4 mg. per square inch.

*Example II*

A commercial glass fiber demister, consisting of a cylinder having a length of 6 inches and a diameter of 6 inches, was unrolled, and a 6 foot long wire reinforced ribbon of knitted glass fiber hose was cut off and impregnated with a palladium chloride solution, following the general procedure of Example I above. The fabric was heated and washed, according to the procedure of Example I above, to provide the final palladium impregnated fabric. The impregnating solution consisted of 10 grams of palladium chloride and 10 ml. of concentrated hydrochloric acid, added to sufficient water to make a volume of 300 ml. The components of the solution were heated until all of the palladium chloride was dissolved, and then 15 grams of sugar were added. The final fabric contained 630 mg. of palladium per square foot.

*Example III*

A glass fiber fabric, as described in Example I, was impregnated with a solution of cobalt nitrate, and heated in an oven for five minutes, at a temperature of 400° C. The impregnating solution consisted of 15 grams of cobalt nitrate, dissolved in sufficient water to make up a volume of 100 ml., and the procedure employed in the preparation of the catalyst was generally similar to that of Example I.

Example IV

A cobalt catalyst was prepared by treating the cobalt oxide catalyst prepared in Example III above with annealing gas (93 percent nitrogen and 7 percent hydrogen), at a temperature of 450° C., for a period of five minutes.

Example V

A ribbon 18 inches long was cut from the unrolled glass fabric demister described in Example II above, and Ceramic Slip having the following analysis:

| | Percent |
|---|---|
| Solids after 850° C. calcination | 68 |

Reaction with acids—$H_2S$ was liberated.

Elements found by semi-quantitative spectral analysis on the calcined material:

| | Percent |
|---|---|
| Mg | 15 |
| Al | 10 |
| Si | 13 |
| Ca | 1.3 |
| Na | 0.6 | was diluted 1 to 1 by volume with water. The ribbon was dipped into the slurry and, upon removal, the excess of the retained slurry, was blown off with compressed air until the mesh appeared open. The damp flexible ribbon was then rolled up into a cylinder or "jelly roll" having a diameter of 2 inches, after which the cylinder was superficially air dried and calcined for a half hour in an oven, at a temperature of 850° to 900° C.

Example VI

A ribbon similar to that used in Example V above was coated with an alumina slurry and calcined at a temperature in the range of 500 to 600° C. In the preparation of the alumina slurry, a solution of aluminum chloride in water was precipitated with aqueous ammonia at pH 8. The precipitate was then filtered and washed with dilute aqueous ammonia at pH 9 until only a trace of chloride remained. The precipitate was then aged at a temperature of about 30° C. until the X-ray pattern thereof showed about 80 percent of aluminum trihydrate and about 20 percent of aluminum monohydrate. The aged slurry was then dried at a temperature of about 150° C., and the resulting powder was calcined at a temperature in the range of 300° to 400° C.

The calcined powder was mixed with an equal weight of an aqueous solution of chromic nitrate, the latter being obtained by dissolving 100 grams of crystallized chromic nitrate in water to a total volume of 1 liter. The slurry was homogenized by passing it through a colloid mill in order to prevent the alumina from settling out.

Example VII

A ribbon similar to that used in Example VI was coated with the slurry used in Example VI following the process described in Example VI but, instead of chromic nitrate, 50 grams of samarium nitrate were dissolved in the water used to make up the slurry.

Example VIII

A sheet of woven glass fabric, measuring 12 inches by 6 inches, and having 12 multiple thread warp and weft strands per inch, was used as the catalyst support for the ceramic. An alumina slurry, similar to that used in Example VI above, was prepared but, instead of 100 grams of chromic nitrate, 60 grams of yttrium nitrate were used. The impregnated fabric was rolled around a cardboard tube of 2-inch O.D., and fastened thereto. After calcining for a half hour at a temperature of 500° C., all of the cardboard burned off and a rigid porous one foot long ceramic tube remained. The intended use of this catalyst was as a lining for a steel tube.

Example IX

A glass fiber fabric ribbon similar to those previously described in Examples V–VII was treated with alumina, silica, and palladium. The alumina was prepared in the form of a suspension by aging an alumina gel to about 80 percent trihydrate, drying the product, calcining at about 300° to 400° C. and grinding the material to a fine powder. About 50 percent by weight of the alumina powder was suspended in 2 percent nitric acid and dispersed as fine particles by colloid milling. The glass ribbon was drawn slowly through the alumina suspension, partially air dried, and wound into a "jelly roll" or cartridge form. Two such pieces were ignited at a temperature of about 600° C. The pieces were treated with colloidal $SiO_2$ (Ludox HS, which had been diluted from a 30 percent $SiO_2$ sol to a 10 percent sol), dried over a two-hour period at 120° C., and then heated slowly up to a final furnace temperature of 800° C. The cartridge was partially cooled in the furnace and then placed in a desiccator. It was treated with Pd in the form of $Na_2PdCl_4$ aqueous solution, heated, and the adsorbed Pd compound reduced to metal, followed by washing and drying. Data on the cartridges preparation are given below:

| Sample No. | 238 | 255 |
|---|---|---|
| Dimensions | 5¼″ x 2½″ | 5¼″ x 2½″ |
| Volume | 925 ml. | 925 ml. |
| Unrolled ribbon area | 390 sq. in. | 340 sq. in. |
| Weight of cartridge | 314 gms. | 305 gms. |
| Amounts of additives used: | | |
| $SiO_2$ | Small, not determined. | Small, not determined. |
| Pd | 3.86 gms. | 4.68 gms. |

Cartridge No. 238 was evaluated in purification of auto engine exhaust and found to give a long life when the engine burned a gasoline, which was analyzed spectrographically to contain about 0.2 gms. of lead per gallon. Cartridge No. 255 was tested when the engine burned a gasoline containing 3.0 gms. of lead per gallon and found to give a relatively short life in oxidation of automobile engine exhaust due to deposit of lead on the catalytically active surface.

Example X

Another catalytic cartridge was prepared by the method described in Example IX except that silica was not added and 12 percent $ThO_2$ in the form of thorium nitrate was mixed into the original alumina suspension. $Na_2PdCl_4$ was added as described in Example IX. This catalyst also was found to give a relatively short life with the gasoline containing 3.0 grams of lead per gallon.

Example XI

A slip of vitreous silica is made consisting of a suspension in 100 gms. of water of 220 gms. of the silica, the latter being 90 percent less than 10 microns in size. This is used to treat a ribbon as described in the preceding Example IX. The ribbon is partially dried, rolled, and heated below 200° C. The rolled demister is immersed in $(NH_4)_2PdCl_4$ solution, heated one hour at 90° C., washed, and dried.

Example XII

A suspension of $Zr(OH)_4$ is prepared by precipitating zirconyl nitrate with ammonia and washing the resultant gel to low nitrate level. The gel is dried and heated to about 150° C., ground to fine powder, reslurried with water, and passed through a colloid mill. A glass ribbon is then coated with this suspended material by passing the ribbon through it, partially air drying the ribbon, winding it into "jelly roll" shape, and calcining it at about 400° C.

The catalyst forms of the present invention find their greatest superiority over currently available catalysts in applications involving high velocity gas stream reactions. This is a result of the greatly increased permeability, high surface area, and excellent physical stability of the new catalysts.

An important application for the catalyst described herein is in automobile engine exhaust lines for the removal of noxious fumes. Conventional pelleted catalysts require extremely large bed cross sections to remove such fumes without creating a back pressure in the engine exhaust line, and a highly elaborate catalyst chamber as part of the muffler would be required.

The glass fabric-based catalyst of the present invention can be placed either in the exhaust pipe or in the muffler of an automobile. It creates minimal back pressure, it is mechanically strong and it is easily replaced. If the catalyst is placed in the exhaust pipe which has narrow cross-section, it is preferred to insert it as a hollow tube in contact with the wall of the pipe to limit the resultant back pressure. If the catalyst is placed in the muffler, with a cross-section for example of six inches diameter, insertion in the "jelly roll" shape as has been described is suitable.

Other applications for the catalyst of the invention are in the catalytic conversion of air contaminants, the removal of oxides of nitrogen from the waste gas from ammonia oxidation plants, and in the generation of heat for power by means of the catalytic combustion of gases.

The problem of decontamination of automobile exhaust streams has not yet been practically solved either by use of after-burners or by catalytic methods. Known methods proposed for this purification require excessive space and cost for satisfactory use with present-day automobiles. Automobile exhaust introduces into the atmosphere significant amounts of such smog-forming materials as nitrogen oxides including NO, $NO_2$ and $N_2O$ and unsaturated hydrocarbons. Such materials constitute the most serious amount of air pollution in Los Angeles and certain other areas afflicted with frequent air temperature inversion conditions. Legal requirements for purification of auto exhausts have been legislated in California, without as yet a satisfactory purification method being demonstrated. Carbon monoxide is also present in significant amount in automobile exhaust streams and is also objectionable.

In accordance with this embodiment of the invention, it has been found that by contacting the exhaust gases from an automobile engine with a catalyst comprising a glass fabric carrier having a palladium, platinum or rhodium metal or vanadium pentoxide as catalytically active material deposited thereon, the nocuous unsaturated hydrocarbons, nitrogen oxides and carbon monoxide are removed or eliminated from the gases and the gases can then be discharged to the atmosphere free or substantially free of these constituents.

Preferably the glass fabric base is coated with an adherent refractory material as previously described, with the catalytically active material deposited on the refractory coating. The proportions of catalytically active material, glass fabric carrier and refractory material in the catalyst are previously disclosed herein. Palladium is the preferred catalytic material for the exhaust gas decontamination.

The catalyst can be in the form of a "jelly roll" formed by rolling or wrapping the glass fabric round tightly upon itself a number of times, this roll being porous and not having a large open space extending therethrough. This catalyst roll, which is of substantial length and diameter, is placed lengthwise in the auto muffler. The exhaust gas passes through the pores of the catalyst roll during its passage through the muffler and the nocuous unsaturated hydrocarbons, nitrogen oxides and carbon monoxide are removed or eliminated therefrom. Apparently, the unsaturated hydrocarbons are removed by being catalytically oxidized to innocuous carbon dioxide and water, and the carbon monoxide is removed by being catalytically oxidized to innocuous carbon dioxide. While the mechanism for the removal of the nitrogen oxides is not definitely known, one plausible theory advanced is that the nitrogen oxides are reduced to nitrogen by reaction with methane or another lower hydrocarbon present in the exhaust gases. The thus-treated exhaust gases free or substantially free of nocuous constituents are then discharged safely into the atmosphere.

Alternatively, the catalyst can be fitted within the exhaust pipe as a tube having an open gas passage or space down the interior of the exhaust pipe, the exhaust gas contacting the catalyst during its passage through the exhaust pipe. A convenient way of placing the catalyst as a tube into the exhaust pipe is by cutting the catalyst fabric into a sheet of substantial length, and having such width as to just fit within the exhaust pipe against its inner surface to form a tube without overlapping of the sheet.

For the auto exhaust purification, the glass fabric base catalyst is a considerable improvement over conventional catalysts, because it provides a stable permeable structure with high surface area and less back pressure than particulate catalyst.

Various porous catalyst cylinders or "jelly rolls" for placing in automobile mufflers were prepared each having 5⅜" diameter and 2½" thickness for the exhaust gas to pass through. The operability of such cylinders under these conditions was shown using a 1954 chassis mounted V-8 Ford engine connected to a water-sealed vacuum pump to serve as load. The pump required 30–50 horsepower depending on r.p.m. At an engine speed corresponding to 15 m.p.h. the load on the pump equals the load required for keeping an ordinary automobile in motion at this speed.

Two carburetors were mounted interchangeably to yield, at constant r.p.m., either rich or lean air-fuel ratios and corresponding exhaust gases high or low in residual combustibles. Several interchangeable mufflers were designed to hold the porous catalyst cylinders or "jelly rolls." The exhaust could be used singly or as dual exhaust. Temperatures ahead of the catalyst and within the catalyst bed were recorded by a 6 point temperature recorder, which permitted following the performance of the catalyst and obtaining information on the type of primary exhaust generated. Also, on starting up the cold engine, the so-called "take off" time of the catalyst was automatically recorded. Gas samples were drawn before and after the catalyst bed.

Operation varied between an idle speed of 450 r.p.m. and a cruising speed of 2000 r.p.m., equivalent to about 45 m.p.h. At idle speed the exhaust gas volume was about 7.6 cu. ft./minute corresponding to a catalyst contact time of about 10 seconds. This contrasts with exhaust gas at the 2000 r.p.m. operation amounting to about 61 cu. ft./minute and a catalyst contact time of about 1.4 seconds. Catalyst life tests were made at 1000 r.p.m. corresponding to 22 m.p.h. speed and 1500 r.p.m. corresponding to 35 m.p.h. speed. Usually the engine was operated at a variety of speeds during the course of the life tests. A typical 24 hour engine operation for these tests is the following:

8 a.m.—
　Start of engine.
　Idle (no load) 450 r.p.m. 30 seconds.
　Drive gear 600 r.p.m. 30 seconds.
　Accelerated to 1000 r.p.m. (22 m.p.h.) and left at this speed.
　Catalyst usually ignited within 2 minutes, frequently faster.
　Engine operated at 1000 r.p.m. during the day.
　Gas samples taken during this period. Overnight or weekends: Engine operated at 1000 r.p.m. (22 m.p.h.) or 1500 r.p.m. (35 m.p.h.).

5 a.m.—
　Engine turned off. Continued secondary air through catalyst bed to insure cooling of catalyst to room temperature prior to restart at 8 a.m.

Catalyst performance was checked by conventional gas analysis as well as by infrared analysis with a Perkin-Elmer model 21 spectograph using a 1 meter cell. Infrared analysis was made in accordance with the procedure disclosed in Air Pollution Foundation Report No. 8, page 56 ff. The gases determined were CO, $CH_4$, saturated hydrocarbons ($C_3$-$C_8$), $C_2H_4$ and $C_2H_2$. Conversion of $CH_4$ and of saturated hydrocarbons is considered to be of subordinate significance. Essential from the air pollution standpoint is the removal of CO, unsaturated hydrocarbons, and nitrogen oxides. Catalyst activity was also checked before and after or during a run in a separate bench reactor using a synthetic gas simulating a lean oxidizing engine exhaust of the composition:

| | Percent |
|---|---|
| CO | 0.1 |
| $C_2H_4$ | 0.05 |
| $C_3H_8$ | 0.05 |
| $O_2$ | 3 |
| $CO_2$ | 12 |
| $N_2O$ | 12 |
| $N_2$ | Balance |

The composition of the gas mix was low enough in combustibles to insure practically isothermal reaction in the test. The catalysts were evaluated by determining the minimum gas temperature needed to convert 80 percent of the respective combustibles. Conversion was measured by infrared analysis of down stream gas samples.

Supplementary air is preferably added to the exhaust line upstream of or prior to the catalyst of this invention to promote complete oxidation of the unburnt fuel in the exhaust. This stoichiometric excess of oxygen is preferably about a 2 percent stoichiometric excess.

*Example XIII*

A 3" high by 5 5/16" diameter "jelly roll" type of porous catalytic cylinder suitable for insertion in the horizontal Ford muffler is prepared. Materials used include:

(1) A commercial glass demister reinforced with wires of stainless steel. The weight ratio of glass thread to metal wire is about 60:40.

(2) An alumina trihydrate gel is drum dried and the powder calcined at about 360° until all the trihydrate is removed and activated alumina remains.

Into a porcelain ball of 8½" diameter ¾" diameter stainless steel balls are placed. 1000 cc. of deionized water and 30 cc. of concentrated $HNO_3$ is measured into the ball mill. About 300 grams of the activated alumina powder are added to the liquid in the ball mill, and then the mill is closed and operated at 80 r.p.m. for about 5 minutes. An additional 300 grams of the powder are added and similarly milled for 5 minutes. Further increments of about 100 grams at a time are added and milled, the slow addition being necessary to prevent gelling of the slurry. After the 1000 grams of activated alumina is added by this method, the slurry remains fluid; it is then ground for 1½ hours.

It should be noted that suspensions with high solid content are highly desirable for coating the glass demister. Thicker and more adherent layers of such solids as the suspended activated alumina of this example are possible when the slurry is highly concentrated.

A 3" high by 5 5/16" diameter cylinder for the Ford muffler is prepared from the glass demister which was described. A ribbon of 7½ ft. length is cut off from a 6" wide roll of the demister. This material is wound on one roll of a coating apparatus, and the coating tank is filled with the alumina suspension described. The demister is then slowly drawn from the roll through the tank onto another roll, each portion of the demister becoming saturated with the slurry as it passes through the tank. The excessive slurry which clogs up the holes in the demister is blown off by a stream of compressed air at about 8–10 p.s.i., as it leaves the coating tank and prior to winding on the second roll.

The coated moist demister ribbon is laid out on a paper-covered table, then covered with two layers of non-absorbent wrapping paper, each 0.004" thick, cut to the size of the ribbon. The demister ribbon including the covering paper is folded in half lengthwise, so that its original 6" width is reduced to 3" and four layers of paper are sandwiched in the fold. The coated material is quite plastic and remains in shape when folded or rolled. The 3" wide double demister ribbon is covered again with a sheet of paper of 3" width and a half foot shorter than the fabric. The whole unit is rolled into a "jelly roll" type of cylinder, the last portion rolled up not being separated by paper and, therefore, adhering sufficiently well to prevent unrolling.

Use of the paper helps to maintain an open structure in the catalyst, the paper burning off on calcination.

The rolled catalyst is allowed to stand at room temperature for about 30 minutes. The shape and size can be corrected after this period if necessary, no allowance for shrinkage on calcination being needed. The roll is oven dried in air for 2 hours at 120° C., then placed into a muffle furnace at 200° C., heated to 600° in 30 minutes and held at this temperature for 1½ hours.

The calcined roll as prepared has its surface alumina somewhat soft and dusty. To harden the surface it is immersed into 10 percent colloidal silica solution, then drained for 10 minutes, dried with evacuation, and recalcined. The calcination is now taken to 800° C. Rolls so prepared should weigh about 400 grams of which around half is the weight of the glass demister.

The calcined demister containing deposited activated alumina and a small amount of silica from the colloidal silica is immersed in a dilute $Na_2PdCl_4$ solution, heated, drained, washed, and dried at 120° C. The Pd is then reduced to metal in a hydrogen gas stream. This porous catalyst roll is snugly inserted into the automobile muffler in such a way that a minimum amount of the auto engine exhaust gas by-passes the catalyst.

*Example XIV*

A catalyst similar in composition and preparation to that of the preceding Example XIII was evaluated with the Ford engine as previously described with a gasoline containing about 0.2 gram of lead per gallon as fuel. Additional air was added from a compressed air line to the engine exhaust stream, so that about a 2 percent stoichiometric excess of oxygen was present. The catalyst "jelly roll" had a volume of 925 ml. and a weight of 314 grams. Its palladium content was 3.86 grams. Using the gasoline containing about 0.2 gram of lead per gallon and the catalyst as described, $C_2H_4$ combustion was still 100 percent after 4000 equivalent driving miles, dropped to about 90 percent after 7000 miles, and after 10,000 miles still remained about 70 percent. CO combustion of the catalyst was 100 percent up to 2500 miles and remained 95 percent to 10,000 miles. The long life of the catalyst when used with the gasoline containing about 0.2 gram of lead per gallon is also evidenced by the low ignition temperature and fast ignition start-up over the period of the 10,000 mile simulated operation. Throughout this period the catalyst ignited the exhaust stream within 3 minutes of the start of the cold engine and prior to heating of the catalyst up to 300° C.

In the production of nitric acid by the oxidation of ammonia, it is difficult to convert all of the oxides of nitrogen to nitric acid and, as a result of the incomplete conversion of these oxides, they are discharged with the waste gases. The presence of such oxides in the waste gases is undesirable inasmuch as they are corrosive in nature and constitute a pollution problem.

The waste or tail gases of nitric acid processes generally have a composition, on a dry basis, by volume, of about 0.1–1.0 percent of mixed nitrogen oxide such as nitric oxide, nitrogen dioxide and nitrous oxide, about 1–4 percent of oxygen, with the remainder nitrogen. In addition, various amounts of steam may be included with the waste gas.

In accordance with another embodiment of the invention, the undesirable oxides of nitrogen together with the oxygen can be removed from such waste gases by passing an admixture of the waste gases and a fuel, the fuel preferably being in stoichiometric excess to the nitrogen oxides and oxygen, into contact with a catalyst comprising a glass fabric carrier having a platinum group metal as catalytically active material supported thereon, preferably palladium or rhodium. Suitable fuels include hydrocarbons, carbon monoxide-containing fuels, and hydrogen, with natural gas preferred because of ready availability together with economy in most locations. The catalyst is supported in a suitable reaction vessel, for instance a stainless steel reaction vessel, and the waste gas passed into contact with the catalyst therein. The nocuous nitrogen oxides are reduced to innocuous nitrogen by reason of the catalytic contacting. The resulting waste gas can then be safely discharged into the atmosphere.

The glass fabric carrier is preferably coated with an adherent refractory material as previously described, with the catalytically active material deposited on the refractory coating. The proportions of catalytically active material, glass fabric, and refractory material are those previously disclosed.

Gas inlet temperatures may be in the range of about 450° F. to 900° F., preferably about 450° to 850° F., and the pressures may be within the range of atmospheric to 500 p.s.i.g. or higher, preferably atmospheric to 150 p.s.i.g. The space velocities may be in the range of about 10,000 to 200,000 standard volumes of gas per volume of catalyst per hour, preferably 40,000 to 110,000 standard volumes per volume per hour.

It will be obvious to those skilled in the art that many modifications may be made within the scope of the present invention without departing from the spirit thereof, and the invention includes all such modifications.

What is claimed is:

1. A supported catalyst comprising a catalyst carrier having an open mesh glass fabric base coated with an adherent solid refractory oxide selected from the group consisting of alumina, silica, titania, zirconia, porcelain and set air-setting and hot-setting bonding mortars and high alumina cements, and a material selected from the group consisting of metals of Group VIII of the Periodic Table and oxides thereof as catalyst on the refractory oxide.

2. A supported catalyst comprising a catalyst carrier having an open mesh glass fabric base coated with an adherent solid refractory oxide selected from the group consisting of alumina, silica, titania, zirconia, porcelain and set air-setting and hot-setting bonding mortars and high alumina cements, with the open mesh structure of the fabric retained, and a material selected from the group consisting of metals of Group VIII of the Periodic Table and oxides thereof as catalyst on the refractory oxide, the refractory oxide and selected catalyst being present in amount from about 10% to about 90% by weight, the balance being the glass fabric and when employed reinforcing wires for the glass fabric, the catalyst being especially suitable for use in high velocity flow catalytic reactions with attendant minimal back-pressure generation and a much reduced catalyst attrition problem and also characterized by being heat shock-resistant.

3. The catalyst of claim 1 wherein the glass fabric is a woven fabric having 6 to 20 warp and weft strands per inch.

4. The catalyst of claim 1 wherein glass threads of the glass fabric are partially disintegrated.

5. The catalyst of claim 1 wherein the catalytic metal is palladium.

6. The catalyst of claim 1 wherein the catalytic metal is platinum.

7. The catalyst of claim 1 wherein the catalytic metal is rhodium.

8. The catalyst of claim 1 wherein the catalytic metal is ruthenium.

9. The catalyst of claim 2 wherein glass threads of the glass fabric are partially disintegrated.

10. A supported catalyst roll comprising a refractory oxide-coated open mesh glass fabric with the open mesh structure thereof retained rolled up upon itself as carrier, the refractory oxide being selected from the group consisting of alumina, silica, titania, zirconia, porcelain and set air-setting and hot-setting bonding mortars and high alumina cements, and a material selected from the group consisting of metals of Group VIII of the Periodic Table and oxides thereof as catalyst on the refractory oxide, the catalyst roll characterized by being mechanically strong, causing minimal gas back-pressure, being readily inserted in and removed from the muffler, a much reduced catalyst attrition problem, and heat shock-resistant.

11. The catalyst of claim 10 wherein glass threads of the glass fabric are partially disintegrated.

12. A supported catalyst tube comprising a refractory oxide-coated open mesh glass fabric tube with the open mesh structure thereof retained as carrier, the refractory oxide being selected from the group consisting of alumina, silica, titania, zirconia, porcelain and set air-setting and hot-setting bonding mortars and high alumina cements, and a material selected from the group consisting of metals of Group VIII of the Periodic Table and oxides thereof as catalyst on the refractory oxide, a central gas passageway extending within and defined by the tube wall, the catalyst being especially suitable for use in high velocity flow catalytic reactions with attendant minimal gas back-pressure generation and a much reduced catalyst attrition problem, and also characterized by being heat shock-resistant.

13. The catalyst of claim 12 wherein glass threads of the glass fabric are partially disintegrated.

References Cited by the Examiner

UNITED STATES PATENTS

| | | | |
|---|---|---|---|
| 2,349,844 | 5/44 | Bertsch | 252—477 |
| 2,674,582 | 4/54 | Darby | 252—477 |
| 2,747,679 | 5/56 | Ruthhardt | 252—477 |
| 2,777,823 | 1/57 | Rottig | 252—459 |
| 2,778,610 | 1/57 | Bruegger | 252—477 |
| 2,825,700 | 3/58 | Ashley et al. | 252—459 |
| 2,887,456 | 5/59 | Halford | 252—477 |
| 2,910,343 | 10/59 | Childers et al. | 23—2 |
| 2,942,932 | 6/60 | Elliott | 23—2 |

MAURICE A. BRINDISI, *Primary Examiner.*